United States Patent
Watanabe

(10) Patent No.: US 12,317,349 B2
(45) Date of Patent: May 27, 2025

(54) COMMUNICATION APPARATUS, CONTROL METHOD, AND COMPUTER-READABLE STORAGE MEDIUM

(71) Applicant: CANON KABUSHIKI KAISHA, Tokyo (JP)

(72) Inventor: Ryo Watanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 241 days.

(21) Appl. No.: 17/849,856

(22) Filed: Jun. 27, 2022

(65) Prior Publication Data
US 2022/0330368 A1 Oct. 13, 2022

Related U.S. Application Data

(63) Continuation of application No. PCT/JP2020/044977, filed on Dec. 3, 2020.

(30) Foreign Application Priority Data

Jan. 9, 2020 (JP) ................................. 2020-002436

(51) Int. Cl.
*H04W 76/15* (2018.01)
*H04W 28/18* (2009.01)
(Continued)

(52) U.S. Cl.
CPC ........... *H04W 76/15* (2018.02); *H04W 28/18* (2013.01); *H04W 28/24* (2013.01); *H04W 72/541* (2023.01)

(58) Field of Classification Search
CPC ..... H04W 28/18; H04W 28/24; H04W 36/06; H04W 72/0453; H04W 72/52; H04W 72/541; H04W 76/15
(Continued)

(56) References Cited

U.S. PATENT DOCUMENTS

| 10,327,125 B2 | 6/2019 | Watanabe |
| 2016/0037542 A1 | 2/2016 | Tang |

(Continued)

FOREIGN PATENT DOCUMENTS

| CN | 103609182 A | 2/2014 |
| CN | 106105297 A | 11/2016 |

(Continued)

OTHER PUBLICATIONS

Notice of Reasons for Refusal issued by the Japanese Patent Office on Oct. 23, 2023 in corresponding JP Patent Application No. 2020-002436, with English translation.
(Continued)

*Primary Examiner* — Robert J Lopata
(74) *Attorney, Agent, or Firm* — Carter, DeLuca & Farrell LLP

(57) ABSTRACT

A communication apparatus that performs communication by establishing a first radio link with a partner apparatus using a first frequency; determines whether interference with a specific radio wave occurs in the first radio link; and in a case where it is determined that the interference occurs in the first radio link, controls to execute first processing in a case where communication can be performed by establishing a plurality of radio links with the partner apparatus, and execute second processing in a case where communication cannot be performed by establishing the plurality of radio links with the partner apparatus, to continue, using a second radio link established using a second frequency different from the first frequency, the communication that has been performed in the first radio link.

10 Claims, 10 Drawing Sheets

(51) Int. Cl.
*H04W 28/24* (2009.01)
*H04W 72/541* (2023.01)

(58) Field of Classification Search
USPC .......................................................... 370/329
See application file for complete search history.

(56) References Cited

U.S. PATENT DOCUMENTS

| | | |
|---|---|---|
| 2016/0219581 A1 | 7/2016 | Tang |
| 2016/0323763 A1 | 11/2016 | Xu |
| 2018/0295488 A1 | 10/2018 | Schrader |
| 2019/0158385 A1* | 5/2019 | Patil ...................... H04W 76/15 |
| 2019/0158413 A1* | 5/2019 | Patil ................... H04W 28/0838 |
| 2021/0037583 A1* | 2/2021 | Seok ...................... H04W 76/15 |
| 2021/0212118 A1* | 7/2021 | Lu ...................... H04W 74/0816 |
| 2022/0104071 A1* | 3/2022 | Jauh ................... H04W 28/0975 |
| 2022/0279362 A1 | 9/2022 | Watanabe |
| 2022/0338285 A1* | 10/2022 | Zhou ...................... H04W 76/15 |
| 2023/0292385 A1* | 9/2023 | Kishida .............. H04W 28/082 |

FOREIGN PATENT DOCUMENTS

| | | |
|---|---|---|
| CN | 110177071 A | 8/2019 |
| JP | 2016-019192 A | 2/2016 |
| JP | 2017-163236 A | 9/2017 |
| JP | 2018-050133 A | 3/2018 |
| JP | 2018-093289 A | 6/2018 |
| JP | 2019-036776 A | 3/2019 |

OTHER PUBLICATIONS

Notice of Reasons for Refusal issued by the Japanese Patent Office on Feb. 5, 2024 in corresponding JP Patent Application No. 2020-002436, with English translation.
Chinese Office Action issued by the China National Intellectual Property Administration on Jun. 26, 2024 in corresponding CN Patent Application No. 202080091804.0, with English translation.
Chu, L et al., "Multiple Link Operation Capability Announcement" IEEE 802.11-19/1159r0 (Sep. 2019) pp. 1-5.
Extended European Search Report issued by the European Patent Office on Dec. 7, 2023 in corresponding EP Patent Application No. 20911389.3.
International Search Report issued by the Japan Patent Office on Dec. 28, 2020 in corresponding International Application No. PCT/JP2020/044977, with English translation.
Hong, H. et al., "Multi-link setup procedure" IEEE 802.11-19/1614r0, IEEE mentor (Sep. 18, 2019) pp. 1-15.
Song, T. et al., "Multi-link Management" IEEE 802.11-19/1943r0, IEEE mentor (Nov. 13, 2019) pp. 1-13.
Chinese Office Action issued by the China National Intellectual Property Administration on Apr. 10, 2025 in corresponding CN Patent Application No. 202080091804.0, with English translation.

* cited by examiner

FIG. 7

| Band ID value | Meaning |
|---|---|
| 0 | TV white spaces |
| 1 | Sub-1 GHz (excluding TV white space) |
| 2 | 2.4 GHz |
| 3 | 3.6 GHz |
| 4 | 4.9 and 5 GHz |
| 5 | 60 GHz |
| 6 | 45 GHz |
| 7 | 6 GHz |
| 8 | 2.4 GHz + 5 GHz |
| 9 | 2.4 GHz + 6 GHz |
| 10 | 5 GHz + 6 GHz |
| 11 | 2.4 GHz + 5 GHz + 6 GHz |
| 12-255 | Reserved |

FIG. 9

| 901 | 902 | 903 | 904 | 905 |
|---|---|---|---|---|
| Element ID | Length | Channel Switch mode | New channel number | Channel Switch count |

FIG. 10

| 901 | 902 | 903 | 904 | 905 | 1001 |
|---|---|---|---|---|---|
| Element ID | Length | Channel Switch mode | New channel number | Channel Switch count | BSSID |

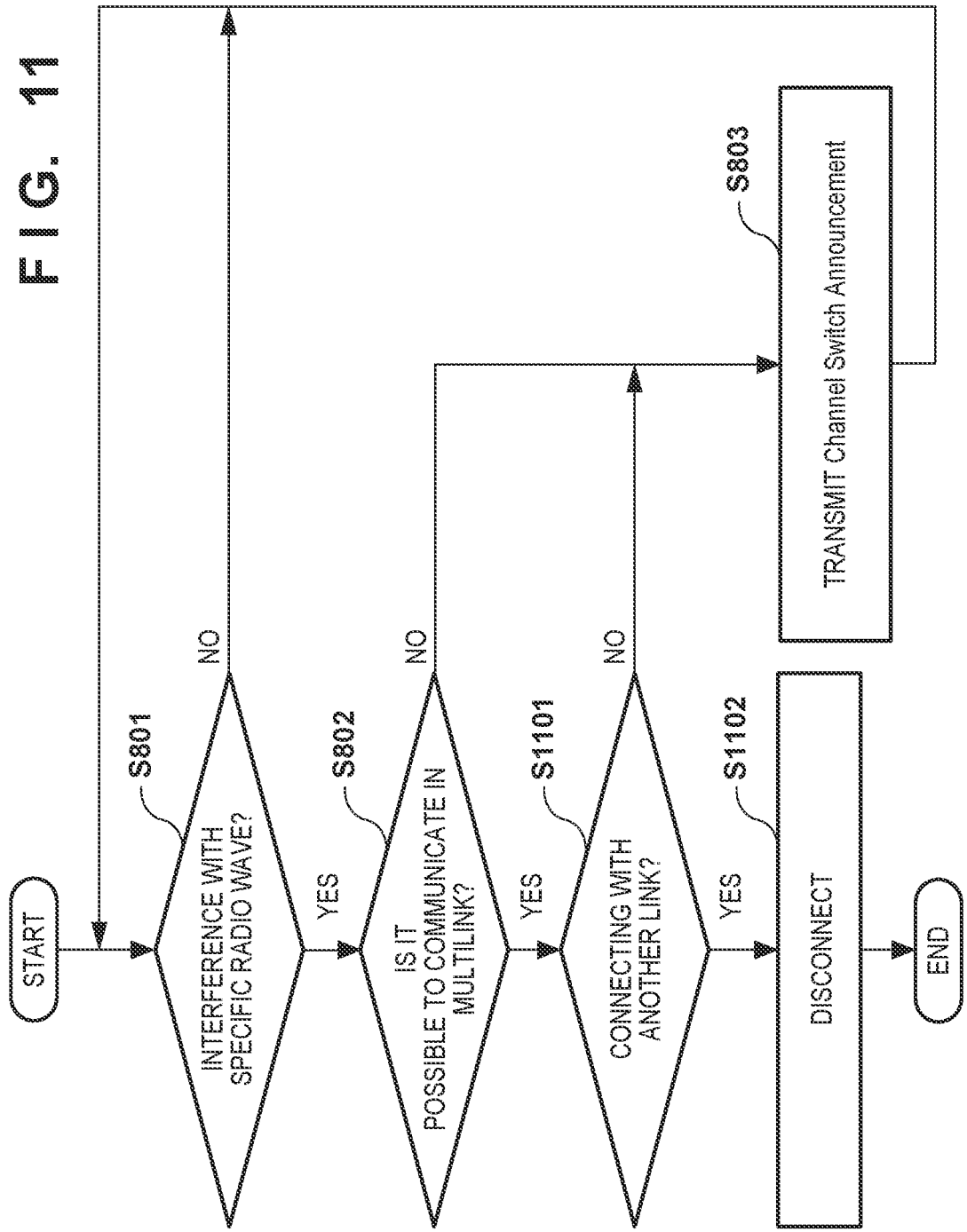

COMMUNICATION APPARATUS, CONTROL METHOD, AND COMPUTER-READABLE STORAGE MEDIUM

CROSS-REFERENCE TO RELATED APPLICATIONS

This application is a Continuation of International Patent Application No. PCT/JP2020/044977, filed Dec. 3, 2020, which claims the benefit of Japanese Patent Application No. 2020-002436 filed Jan. 9, 2020, both of which are hereby incorporated by reference herein in their entirety.

BACKGROUND OF THE INVENTION

Field of the Invention

The present invention relates to a communication apparatus, a control method, and a computer-readable storage medium and, more particularly, to a communication control technique in wireless communication.

Background Art

Along with the recent increase in a data amount to be communicated, communication techniques such as a wireless Local Area Network (LAN) have been developed. As the main communication standard of the wireless LAN, the Institute of Electrical and Electronics Engineers (IEEE) 802.11 standard series is known. The IEEE 802.11 standard series includes a standard such as IEEE 802.11a/b/g/n/ac/ax standards. For example, in the latest IEEE 802.11ax standard, a technique for, using Orthogonal Frequency Division Multiple Access (OFDMA), not only implementing high peak throughput of 9.6 gigabits per sec (Gbps) at maximum but also improving the communication speed under congestion is standardized (see Japanese Patent Laid-Open No. 2018-050133).

On the other hand, to further improve the throughput, the frequency utilization efficiency, and the latency of communication, Task Group for a standard called IEEE 802.11be succeeding IEEE 802.11ax has been formed. In IEEE 802.11be, there has been examined a technique for allowing communication devices such as an access point (AP) to transmit radio signals to a single station (STA) by simultaneously using frequency bands including the 2.4 GHz band, the 5 GHz band, and the 6 GHz band. This can improve throughput as compared to a case where a single frequency band is used in accordance with a conventional standard. In addition, by selectively using, from a plurality of frequency bands, for example, some frequency bands without congestion, latency can be shortened. Also, when a plurality of frequency bands are concurrently used, a radio frequency space can be used more efficiently than in a case where the bandwidth is increased in one frequency band.

The present invention provides a method for efficiently executing use channel setting control in a case where a plurality of frequency bands are concurrently used, and more generally, in a case where a plurality of frequency channels of one or more frequency bands are concurrently used.

SUMMARY OF THE INVENTION

According to one aspect of the present invention, there is provided a communication apparatus comprising a communication unit configured to perform communication by establishing a first radio link with a partner apparatus using a first frequency, a determination unit configured to determine whether interference with a specific radio wave occurs in the first radio link, and a control unit configured to control to, in a case where it is determined that the interference occurs in the first radio link, execute first processing in a case where communication can be performed by establishing a plurality of radio links with the partner apparatus, and execute second processing in a case where communication cannot be performed by establishing the plurality of radio links with the partner apparatus, to continue, using a second radio link established using a second frequency different from the first frequency, the communication performed in the first radio link.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 7 is a view showing an example of a Band ID field:

FIG. 9 is a view showing an example of a Channel switch announcement element format;

FIG. 10 is a view showing an example of a radio frequency change notification format including a BSSID; and FIG. 11 is a flowchart showing the second example of the procedure of processing executed after the start of communication.

DESCRIPTION OF THE EMBODIMENTS

Figure 1:
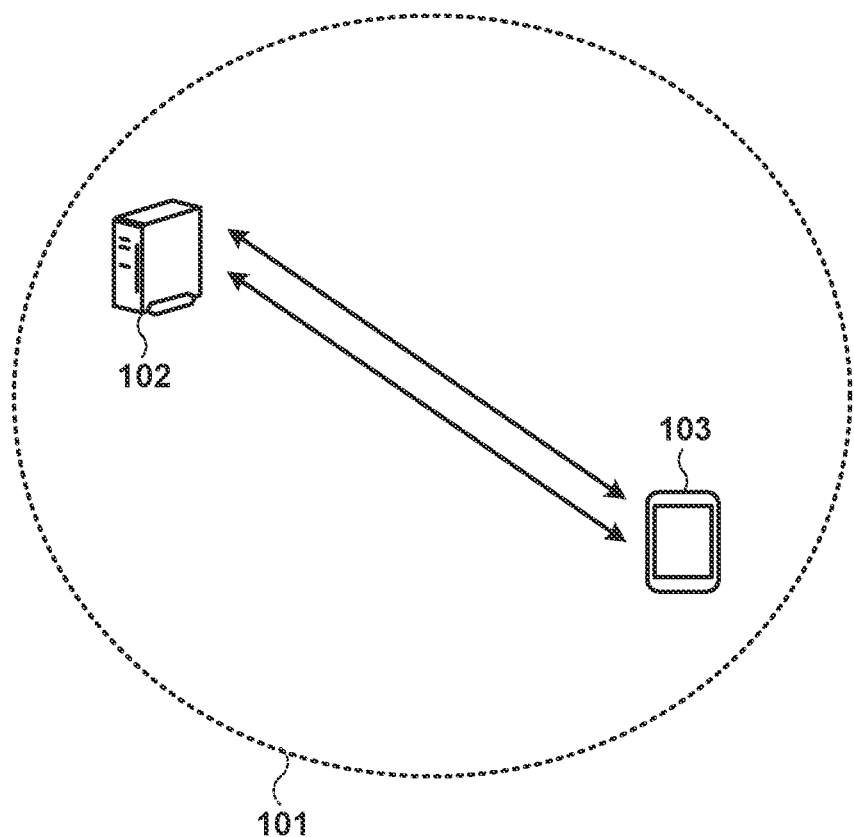
FIG. 1 is a view showing an example of a network configuration.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(Network Configuration)

FIG. 1 shows an example of the configuration of a wireless communication network according to this embodiment. The wireless communication network is configured to include an access point (AP 102) and a terminal (STA 103). Both the communication apparatuses are communication apparatuses capable of executing wireless communication complying with the IEEE 802.11be standard, and can be configured to execute even wireless communication complying with standards formulated before the IEEE 802.11be standard. In FIG. 1, the AP 102 can, using, as a partner apparatus, the STA 103 existing in the range of an almost circular area 101 with respect to the AP 102 itself as the center, establish connection with the STA 103 and perform wireless communication (transmission/reception of radio signals). The AP 102 can, for example, form a wireless communication network in the range of the area 101. Note that the area 101 may cover a wider range or may cover only a narrower range. Note that FIG. 1 shows the wireless communication network including one AP and one STA as an example. There may be two or more of each of these communication apparatuses. In addition, for example, a STA or the like complying with only standards before the IEEE 802.11be standard may exist in the network and may be connected to the AP 102 to perform communication. Note that the AP 102 and the STA 103 can communicate with the partner apparatuses by concurrently using a plurality of radio frequency bands or by selectively using some of the plurality of radio frequency bands. Note that in a case where two or more radio frequency bands are concurrently used, a plurality of radio links can be established between the AP 102 and the STA 103 to perform communication.

(Configuration of AP and STA)

Figure 2:
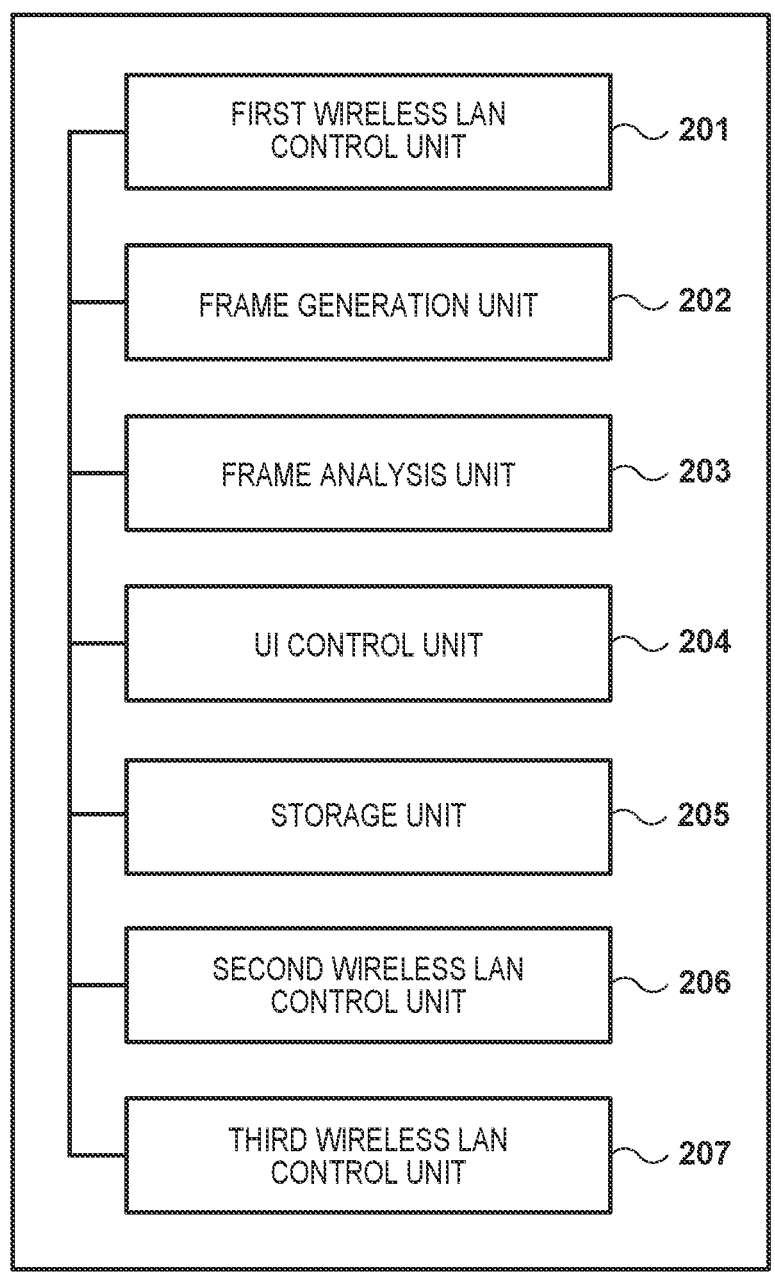
FIG. 2 is a block diagram showing an example of the functional configuration of an AP and an STA.

FIG. 2 is a block diagram showing an example of the functional configuration of the AP 102 and the STA 103. Each of the AP 102 and the STA 103 includes a first wireless LAN control unit 201, a second wireless LAN control unit 206, and a third wireless LAN control unit 207, which are configured to control wireless LAN communication in three frequency bands including, for example, the 2.4 GHz band, the 5 GHz band, and the 6 GHz band, respectively. However, these are merely examples. For example, wireless LAN control concerning a plurality of frequency bands may be executed by a common wireless LAN control unit, and two or less wireless LAN control units may be prepared. Also, to cope with more frequency bands or more distributively perform communication control in one frequency band, four or more wireless LAN control units may be prepared. These wireless LAN control units execute communication control of a wireless LAN in accordance with various kinds of procedures defined in the IEEE 802.11 standard series. Note that in this embodiment, these wireless LAN control units comply with the IEEE 802.11be standard. Each wireless LAN control unit can be implemented by antennas and circuits configured to transmit/receive radio signals to/from another communication apparatus having a wireless LAN communication function, and programs configured to control these.

The AP 102 and the STA 103 each further include a frame generation unit 202, a frame analysis unit 203, a UI control unit 204, and a storage unit 205.

The frame generation unit 202 generates a radio frame to be transmitted by each of the above-described wireless LAN control units. The radio frame is configured to include predetermined control information regardless of, for example, whether user data is included or not. The contents of control information generated by the frame generation unit 202 may be restricted by settings stored in the storage unit 205. In addition, the contents of control information may be changed by a user setting from the UI control unit 204. The frame analysis unit 203 interprets a frame received by the wireless LAN control unit and extracts data included in the frame. If contents concerning control of the wireless LAN are included in the received frame, the contents are reflected on each wireless LAN control unit. When control information included in the frame received by one of the wireless LAN control units is extracted by the frame analysis unit 203, even the other wireless LAN control units that have not received the frame can perform control based on the control information.

The UI control unit 204 is implemented by hardware associated with user interfaces such as a touch panel and buttons used to accept a user operation to the AP 102 and the STA 103, and programs configured to control these. Note that the UI control unit 204 also has a function of presenting, to the user, information such as display of an image or audio output. The storage unit 205 is a storage device that can be implemented by a ROM and a RAM configured to store programs to operate the AP and data.

Figure 3:
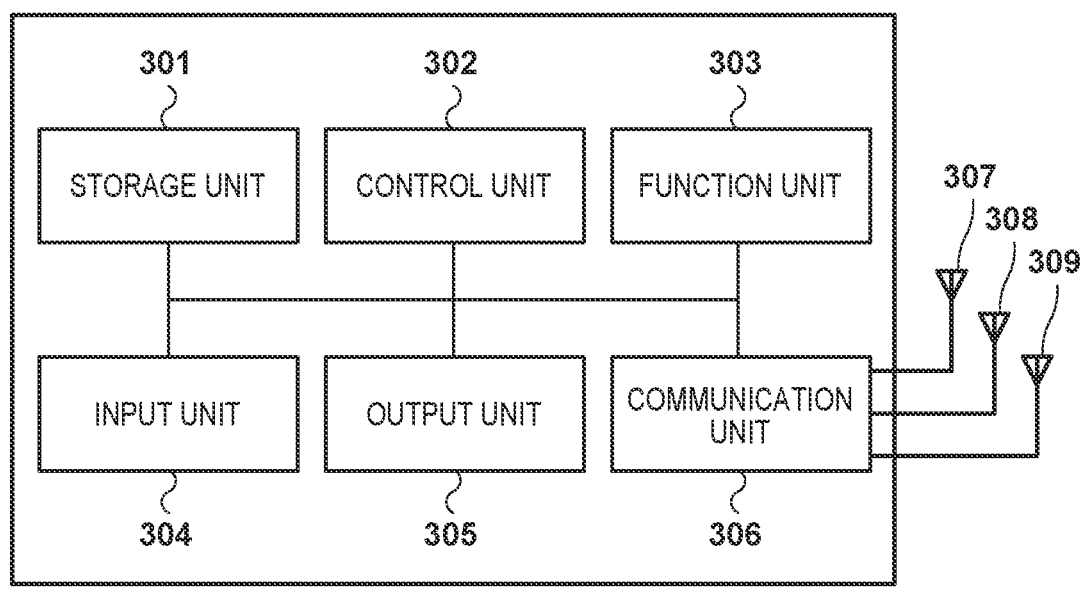
FIG. 3 is a block diagram showing an example of the hardware configuration of the AP and the STA.

FIG. 3 is a block diagram showing the hardware configuration of the AP 102 and the STA 103. Each of the AP 102 and the STA 103 includes, as an example of the hardware configuration, a storage unit 301, a control unit 302, a function unit 303, an input unit 304, an output unit 305, a communication unit 306, and a radio antenna 307 to an antenna 309.

The storage unit 301 is formed by both a ROM and a RAM or one of these, and stores programs configured to perform various kinds of operations to be described later and various kinds of information such as communication parameters for wireless communication. Here, "ROM" is the acronym of Read Only Memory, and "RAM" is the acronym of Random Access Memory. Note that as the storage unit 301, not only a memory such as a ROM or a RAM but also a storage medium such as a flexible disk, a hard disk, an optical disk, a magnetooptical disk, a CD-ROM, a CD-R, a magnetic tape, a nonvolatile memory card, or a DVD may be used.

The control unit 302 is formed by, for example, at least one processor such as a CPU or an MPU, an Application Specific Integrated Circuit (ASIC), a Digital Signal Processor (DSP), a Field Programmable Gate Array (FPGA), or the like. Here, "CPU" is the acronym of Central Processing Unit, and "MPU" is the acronym of Micro Processing Unit. The control unit 302 executes programs stored in the storage unit 301, thereby controlling the whole apparatus such as the AP 102 or the STA 103. Note that the control unit 302 may control the entire AP 102 by cooperation of the programs stored in the storage unit 301 and an Operating System (OS).

Also, the control unit 302 controls the function unit 303 and executes predetermined processing such as image capturing, printing, or projection. The function unit 303 is hardware for the AP 102/STA 103 to execute predetermined processing. For example, if the AP 102/STA 103 is a camera, the function unit 303 is an image capturing unit and performs image capturing processing. Also, for example, if the AP 102/STA 103 is a printer, the function unit 303 is a print unit and performs print processing. Also, for example, if the AP 102/STA 103 is a projector, the function unit 303 is a projection unit and performs projection processing. Data to be processed by the function unit 303 may be data stored in the storage unit 301, or may be data communicated with another AP or STA via the communication unit 306 to be described later.

The input unit 304 accepts various kinds of operations from the user. The output unit 305 performs various kinds of outputs to the user. Here, the output by the output unit 305 includes, for example, at least one of display on a screen, audio output by a speaker, and vibration output. Note that both the input unit 304 and the output unit 305 may be implemented by one module, like a touch panel. Also, each of the input unit 304 and the output unit 305 may be incorporated in the AP 102/STA 103, or may be configured to be externally attached.

The communication unit 306 controls wireless communication complying with the IEEE 802.11 standard series or controls IP communication. The communication unit 306 is a so-called radio chip, which itself may include one or more processors or memories. In this embodiment, the communication unit 306 can execute processing complying with at least the IEEE 802.11be standard. In addition, the communication unit 306 controls the antennas 307 to 309 and transmits/receives radio signals for wireless communication. The AP 102/STA 103 communicates content(s) such as image data, document data, or video data with another communication apparatus via the communication unit 306. Each of the antennas 307 to 309 is an antenna configured to transmit/receive a radio signal in one of, for example, the 2.4 GHz band, the 5 GHz band, and the 6 GHz band. Note that the frequency bands (and a combination thereof) to be handled by the antennas 307 to 309 are not particularly limited. Each of the antennas 307 to 309 may be a single antenna or may be configured to include two or more antennas to perform Multi-Input and Multi-Output (MIMO) transmission/reception. Note that FIG. 3 shows at least three antennas 307 to 309. However, the present invention is not limited to this. For example, when a multiband antenna that supports at least two of the plurality of frequency bands described above is used, the AP 102/STA 103 may include only one or two antennas. Also, the AP 102/STA 103 may include more antennas.

(Procedure of Processing)

In this embodiment, the AP 102 and the STA 103 can be connected in each of the 2.4 GHz band, the 5 GHz band, and the 6 GHz band and they execute wireless communication using at least one of these frequency bands. At this time, it is configured such that if a frequency band whose interference is detected exists, communication between the AP 102 and the STA 103 in that frequency band is limited. For example, if occurrence of interference in a predetermined frequency band is detected, the AP 102 shifts communication in the predetermined frequency band to communication in another frequency band. This processing will be described below.

Figure 4:
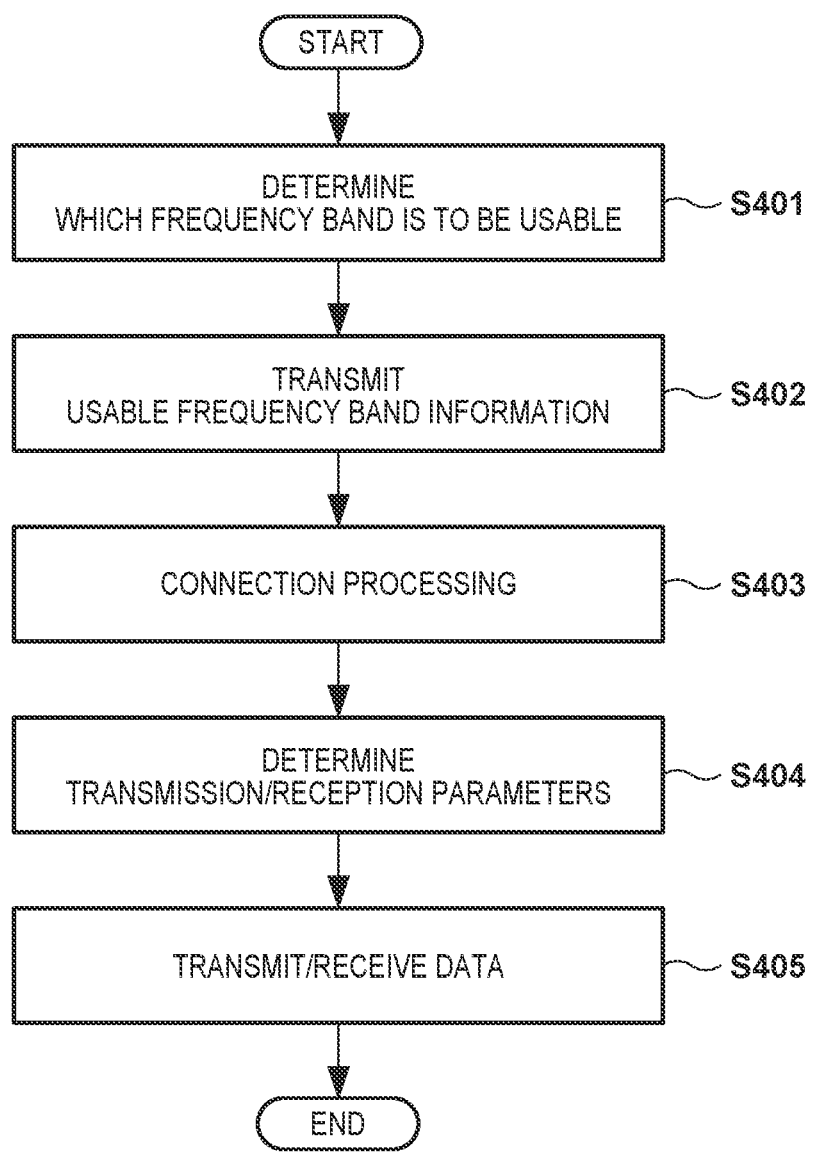
FIG. 4 is a flowchart showing an example of the procedure of processing executed at the start of communication.
Figure 5:
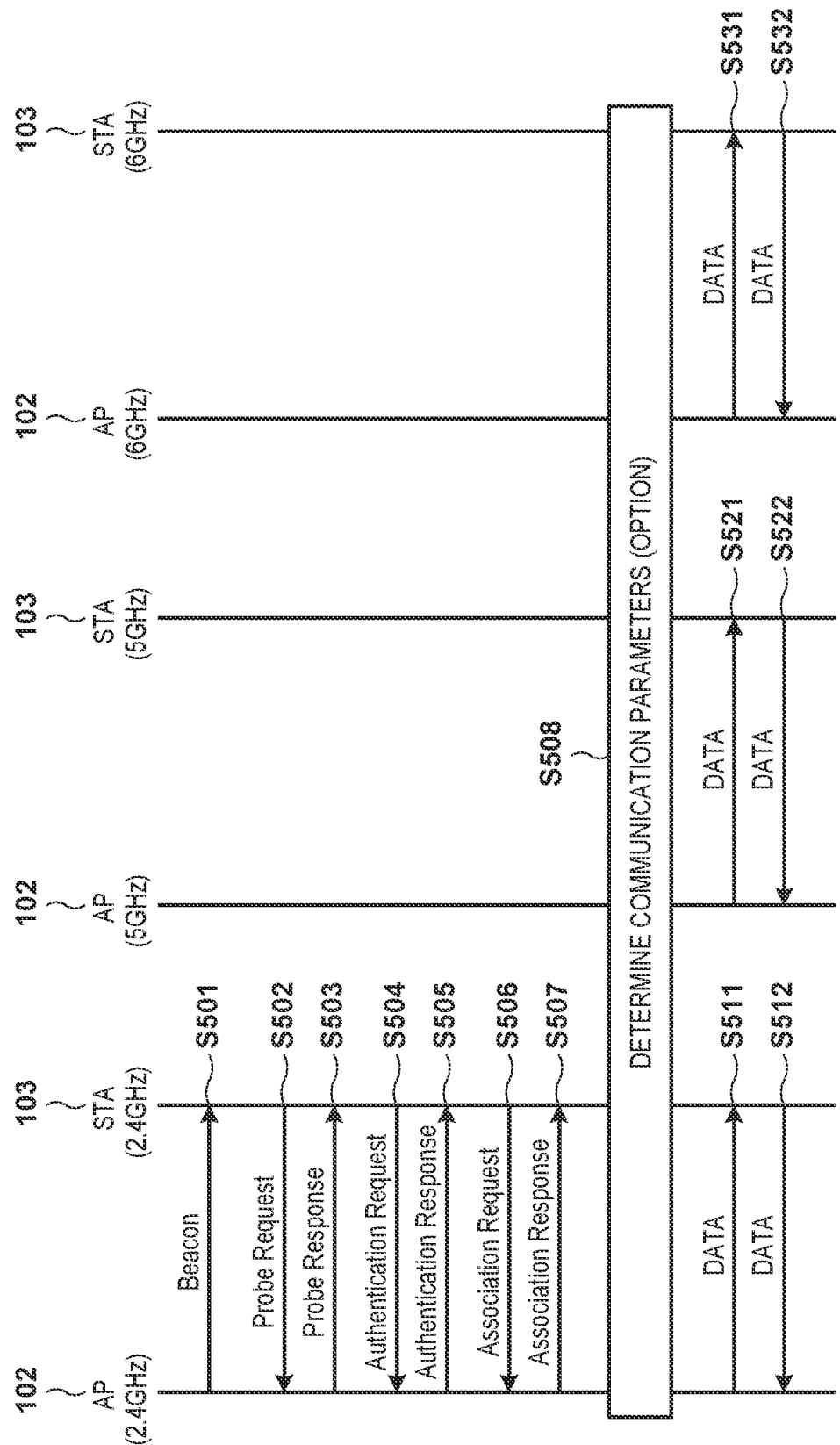
FIG. 5 is a sequence chart showing an example of the procedure of communication.

FIG. 4 shows an example of the procedure of processing at the start of communication, which is executed by the AP 102 (or the STA 103 in some cases) in this embodiment. The processing shown in FIG. 4 can be implemented by, for example, the control unit 302 of the AP 102 (or the STA 103 in some cases) executing a program stored in the storage unit 301. Note that dedicated hardware for implementing the processing shown in FIG. 4 may be prepared, or, for example, the communication unit 306 of the AP 102 (or the STA 103 in some cases) may execute the processing shown in FIG. 4 by a chip or the like provided in the communication unit 306. FIG. 5 shows an example of the procedure of communication between the AP 102 and the STA 103 according to this embodiment. Note that it is assumed here that a management frame such as a signal for connection processing is transmitted/received only in the 2.4 GHz band. That is, a control frame in the 2.4 GHz band controls connection and disconnection in other frequency bands. Since a control frame is not unnecessarily transmitted/received in each frequency band, radio resources can effectively be used. Note that this is an example, and transmission/reception of a control frame may be done in the 5 GHz band or the 6 GHz band. For example, in a state in which the 2.4 GHz band cannot be used, transmission/reception of a control frame can be performed in the 5 GHz band or the 6 GHz band. In any case, for example, when communication control in some frequency bands is controlled by a control frame transmitted/received in another frequency band, radio resources can effectively be used.

First, the AP 102 determines which frequency band is to be usable (step S401). In an example, the AP 102 can determine a usable frequency band based on the degree of congestion in the surrounding radio environment. For example, the AP 102 can determine that a frequency band whose degree of congestion is a predetermined value or more cannot be used. The AP 102 can determine that a frequency band whose degree of congestion is less than the predetermined value is usable. At this time, the AP 102, for example, can sum up the number of Probe Requests for each of which a response has been received in Probe Requests transmitted in each frequency band and estimate the degree of congestion of the frequency band. The AP 102 may sum up the number of Beacons observed during a predetermined period in each frequency band, thereby estimating the degree of congestion of the frequency band. The AP 102 may estimate the degree of congestion of each frequency band by summing up the number of times of carrier sense during a predetermined period or by exchanging information with another AP. Alternatively, the AP 102 may determine a usable frequency band based on an index different from the degree of congestion of each frequency band. For example, a frequency band whose noise level in a no signal state is lower than a predetermined level is determined to be usable, thereby determining the usable frequency band. Note that in the following, it is assumed that the AP 102 determines that all of the 2.4 GHz band, the 5 GHz band, and the 6 GHz band are usable.

After the usable frequency bands are determined, the AP 102 transmits usable frequency band information using, for example, a Beacon frame (step S402 and S501). Here, for example, the usable frequency band information is added to a Band ID of a Multi-band element in the Beacon frame and transmitted. Note that the AP 102 periodically transmits the Beacon frame in accordance with a Beacon Interval in one of the usable frequency bands. The Beacon Interval is generally 100 msec but is not limited to this. The usable frequency band information may include information representing the frequency band used to transmit the Beacon frame or may not include the information of the frequency band. For example, a Beacon transmitted in the 2.4 GHz band includes information representing the 5 GHz band and the 6 GHz band as usable frequency band information. Similarly, a Beacon transmitted in the 5 GHz band can include information representing the 2.4 GHz band and the 6 GHz band as usable frequency band information, and a Beacon transmitted in the 6 GHz band can include information representing the 2.4 GHz band and the 5 GHz band as usable frequency band information.

Note that the usable frequency band information may be included in a frame different from the Beacon frame. For example, the usable frequency band information can be included in a Probe Response, an Authentication Response, an Association Response, or a Reassociation Response transmitted by the AP 102. Also, the STA 103 can transmit, to the AP 102, a Probe Request, an Authentication Request, an Association Request, or a Reassociation Request including the usable frequency band information of the self-apparatus.

Figure 6:
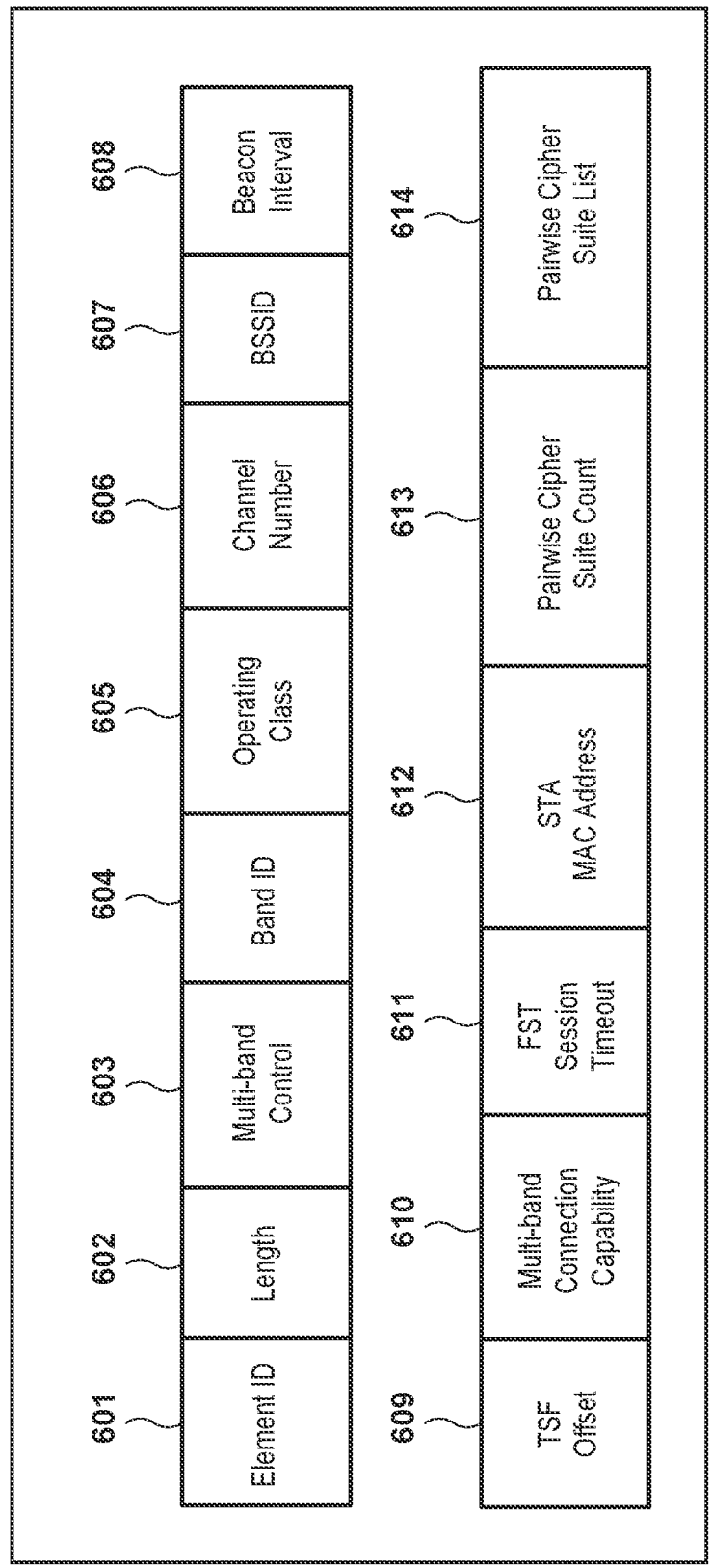
FIG. 6 is a view showing an example of a Multi-band element format.

The usable frequency band information can be expressed by a Multi-band element format as shown in FIG. 6. Here, a portion associated with this embodiment is a Band ID 604.

Note that the remaining portions are the same as in the conventional standards, and a description thereof will be omitted here. In this embodiment, a value indicating the information of a combination of usable frequency bands is newly defined as a value stored in the Band ID 604. For example, as shown in FIG. 7, a value "8" stored in the Band ID 604 is defined as a numerical value indicating the combination of 2.4 GHz and 5 GHz bands. Also, a value "9" is defined as a numerical value indicating the combination of 2.4 GHz and 6 GHz bands, a value "10" is defined as a numerical value indicating the combination of 5 GHz and 6 GHz bands, and a value "11" is defined as a numerical value indicating the combination of 2.4 GHz, 5 GHZ, and 6 GHz bands. Note that this is merely an example, and, for example, an arbitrary value or information field defined in association with a usable frequency band can be used. For example, a plurality of Multi-band elements may be added to a Beacon. For example, if the 2.4 GHz band, the 5 GHz band, and the 6 GHz band are determined as the usable frequency bands, Multi-band elements including three Band IDs 604 storing their respective values "2", "4", and "7" are added to a Beacon.

When adding a plurality of Multi-band elements to a Beacon, the AP 102 can store the information of an operable radio frequency by combining an Operating Class 605 and a Channel Number 606. For example, in Europe, if the AP 102 is used in channel=5, channel=36, and channel=220, the Operating Class 605 and the Channel Number 606 can be set as follows. First, in a Multiband element indicating that it operates in the 2.4 GHz band, the value of the Band ID 604 is set to "2", the value of the Operating Class 605 is set to "30", and the value of the Channel Number 606 is set to "5". Also, in a Multi-band element indicating that it operates in the 5 GHz band, the value of the Band ID 604 is set to "4", the value of the Operating Class 605 is set to "5", and the value of the Channel Number 606 is set to "36". Also, in a Multi-band element indicating that it operates in the 6 GHz band, the value of the Band ID 604 is set to "7", the value of the Operating Class 605 is set to "19", and the value of the Channel Number 606 is set to "220". This makes it possible to express even a case where, for example, the AP 102 uses different radio frequency channels of the same frequency band. For example, when channel=5, channel=36, and channel=136 are used, a plurality of Multi-band elements are prepared, thereby expressing the information of usable frequency channels. Note that hereinafter, a notation "ch" may be used to designate the number of a specific radio frequency channel. For example, a radio frequency channel of channel=36 can be expressed as "36ch" without any special notice.

The AP 102 establishes connection with the STA 103 based on the transmitted usable frequency band information (step S403). For example, the STA 103 transmits a Probe Request using one of the frequency bands that the self-apparatus can use, and starts a scan operation (S502). Note that in this embodiment, it is assumed that the STA 103 transmits the Probe Request in the 2.4 GHz band. As a reply to the Probe Request, the STA 103 receives a Probe Response from the AP 102 using the frequency band used to transmit the Probe Request (S503). In an example, the STA 103 can detect a frequency handled by the AP 102 and a radio frequency channel operating at the frequency based on the value of the Band ID included in the Probe Response. After that, the STA 103 transmits an Authentication Request to the AP 102 (S504), and receives an Authentication Response from the AP 102 (S505). After that, when the STA 103 transmits an Association Request to the AP 102 (S506), and receives an Association Response from the AP 102 (S507), connection is established between the AP 102 and the STA 103. Note that in this embodiment, a case where connection is established without encryption will be described. However, the present invention is not limited to this. To establish secure connection using encryption between the AP 102 and the STA 103, communication processing such as Wi-Fi Protected Access (WPA) or WPA2 (not shown) can be performed after this. Also, to perform processing of WPA3, SAE Commit and SAE Confirm may be transmitted at the time of transmission/reception of the Authentication Request. In this case, 4-way handshake can be executed after transmission/reception of the Association Request and the Association Response. The STA 103 can establish connection in two or more usable frequency bands. For example, if there are three usable frequency bands, connection may be established using two or all of these. For example, the STA 103 may transmit the Probe Request not only in the 2.4 GHz band but also in the 5 GHz band or the 6 GHz band.

After the connection is established, the AP 102 and the STA 103 can determine transmission/reception parameters (step S404 and S508). If a plurality of connections are established, the transmission/reception parameters are information for determining how to distribute transmission/reception data to each connection. For example, a data distribution amount can be determined in accordance with the maximum throughput usable in each frequency band or by actually transmitting/receiving a test packet and calculating the current throughput. The value may be changed as needed. For example, after data transmission/reception is performed for a predetermined period, the data distribution amount for the next predetermined period can be determined from the actually transmitted/received data amount. In addition, frequency bands to transmit/receive control packets and data packets may be separated. For example, a setting can be done such that management frames for control are transmitted/received in the 2.4 GHz band, and data frames are transmitted/received in 5 GHz and 6 GHz bands. Also, for example, in communication for an application such as Mixed Reality or Augmented Reality, a frequency band to transmit/receive information for control of the application and a frequency band to transmit/receive other pieces of information can be separated. For example, position information, posture information, and delay control information can be transmitted/received in the 2.4 GHz band, and content information and occlusion information for blocking a visible object can be transmitted/received in the 5 GHz band or the 6 GHz band. In addition, when transmitting/receiving a camera image, metainformation such as date/time data or a photo parameter can be transmitted/received in the 2.4 GHz band, and pixel information can be transmitted/received in the 5 GHz band and the 6 GHz band. Transmission/reception parameter determination processing may not be performed. For example, in connections corresponding to the frequency bands, different streams can be transmitted/received independently.

After that, the AP 102 and the STA 103 transmit/receive data using the determined transmission/reception parameters (step S405, S511, S512, S521, S522, S531, and S532). Here, the state in which data transmission/reception can be performed is called a state in which a radio link is established. This time, it is assumed that radio links are established in 5ch in 2.4 GHz band, 36ch in 5 GHz band, and 220ch in 6 GHz band.

Here, in the 5 GHz band, this frequency band is assumed to be used in a meteorological observation radar or a military radar. It is therefore necessary to suppress interference with these. Hence, the conventional IEEE 802.11 standard series defines that an interference avoidance technique called Dynamic Frequency Selection (DFS) is used at the time of communication in the 5 GHz band (see Japanese Patent Laid-Open No. 2019-036776). According to DFS, it is possible to prevent interference with another specific application purpose of radio waves, like a meteorological observation radar. Similarly, even in a frequency band other than the 5 GHz band, it can be assumed that a radio wave is used for an application purpose for which occurrence of interference should be avoided. In an example, it is assumed that if predetermined communication with high priority is performed, interference with the predetermined communication should be avoided. In this case, the following processing can be executed. Communication with high priority is communication for a predetermined application such as an emergency call. By analyzing the header of a radio frame, the AP 102 or the STA 103 can recognize that such communication is being performed. In these frequencies as well, interference avoidance by DFS can be performed. However, in frequency channel switching by DFS, it is necessary to confirm for 60 sec whether interference occurs in the frequency channel after the switching. Hence, the time until communication is resumed is long.

In this embodiment, if the AP 102 (or the STA 103 in some cases) can establish a plurality of radio links in a plurality of frequency bands (or a plurality of frequency channels of one or more frequency bands), processing for continuing communication while efficiently avoiding interference is executed. That is, if, for example, it is determined in one of a plurality of usable frequency bands, by detecting a radio wave of a specific application purpose, that interference will occur, communication is continued in another frequency band. For example, the AP 102 (or the STA 103 in some cases) performs processing for using a frequency band different from a frequency band where interference will occur without switching the setting of the usable frequency bands.

Figure 8:
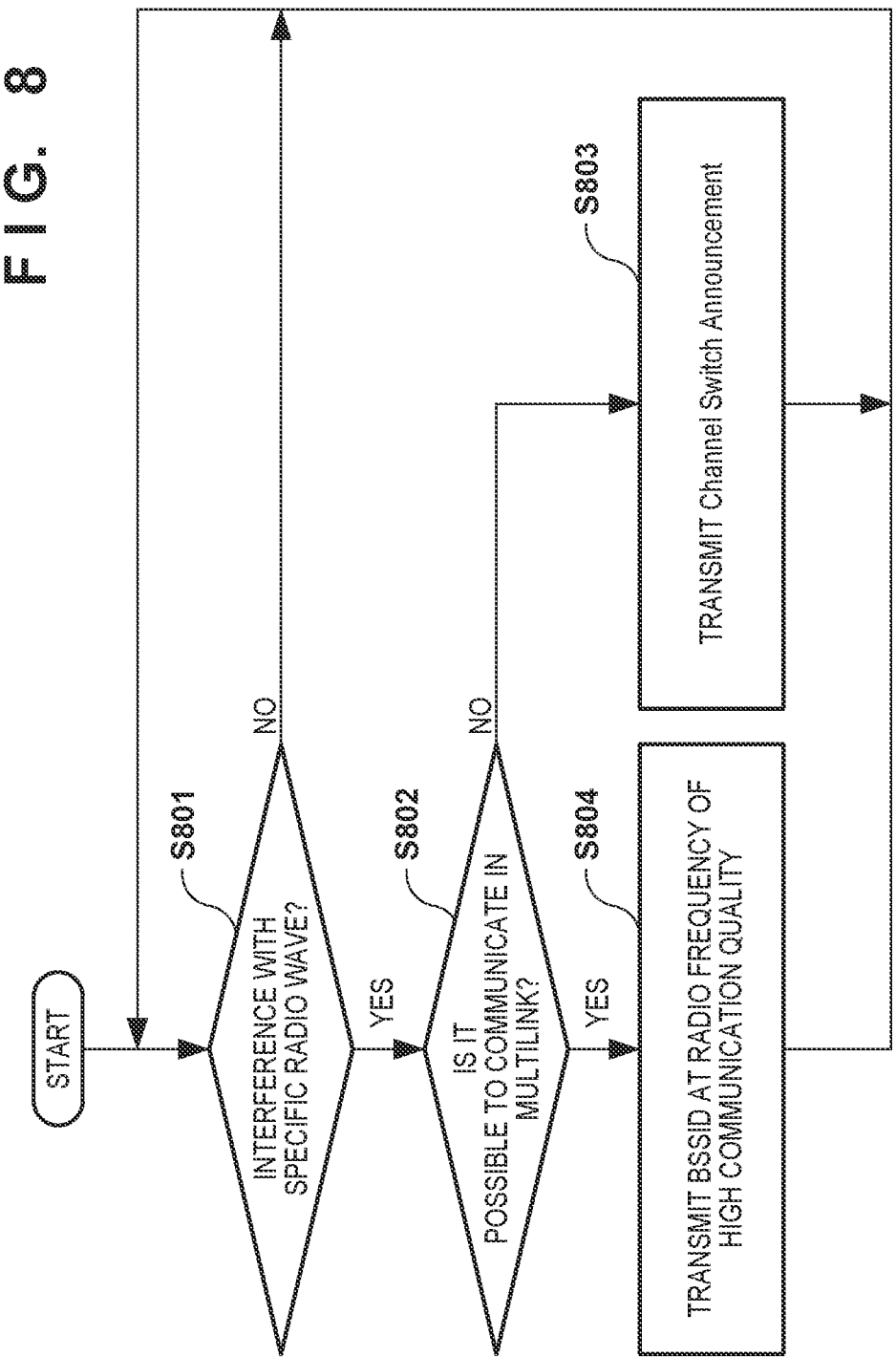
FIG. 8 is a flowchart showing the first example of the procedure of processing executed after the start of communication.

FIG. 8 shows an example of the procedure of processing executed in each radio link after the start of communication. The processing shown in FIG. 8 can be implemented by, for example, the control unit 302 of the AP 102 (or the STA 103 in some cases) executing a program stored in the storage unit 301. Note that dedicated hardware for implementing the processing shown in FIG. 8 may be prepared, or, for example, the communication unit 306 of the AP 102 (or the STA 103 in some cases) may execute the processing shown in FIG. 8 by a chip or the like provided in the communication unit 306. An example of processing in the 36ch radio link in the 5 GHz band will be described here. However, this is merely an example, and the same processing can be executed even in the 2.4 GHz band or the 6 GHz band. Note that this processing is executed on a link basis. That is, if, for example, a plurality of radio links are established in different frequency channels of the 5 GHz band, the processing shown in FIG. 8 is concurrently executed for the radio links.

First, the AP 102 determines whether interference with another specific radio wave (a radio wave of a specific radio system) occurs in 36ch (step S801). The AP 102 executes this determination by, for example, executing specific radar detection processing, like the DFS function. Upon determining that interference with a specific radio wave occurs in 36ch (YES in step S801), the AP 102 advances the process to step S802. On the other hand, if it is not determined that interference with a specific radio wave occurs in 36ch (NO in step S801), the AP 102 continues monitoring whether interference occurs.

In step S802, the AP 102 determines whether the self-apparatus can communicate in a multilink. If the AP 102 can communicate in a multilink (YES in step S802), the AP 102 advances the process to step S804. If the AP 102 cannot communicate in a multilink (NO in step S802), the AP 102 advances the process to step S803. The determination of step S802 can be done by, for example, determining whether the AP 102 includes a configuration for enabling multilink communication in at least one of hardware and software. For example, if it is physically impossible to use a plurality of links such as in a case where each radio antenna provided in the AP 102 corresponds to only a single frequency band, the AP 102 determines that multilink communication cannot be performed (NO in step S802). Also, in a case where the RAM of the AP 102 does not have a sufficient free space, and a plurality of links cannot be implemented, the AP 102 determines that multilink communication cannot be performed (NO in step S802). Note that the criterion such as antenna performance or a RAM is merely an example, and a criterion other than these may be used. For example, if the partner apparatus (STA 103) connected to the AP 102 does not have the multilink communication capability, it may be determined that multilink communication cannot be performed with the partner apparatus. In this case, if the partner apparatus (STA 103) connected to the AP 102 has the multilink communication capability, it is determined that multilink communication can be performed with the partner apparatus. If such a determination criterion is used, the AP 102 may perform different processing (one of steps S803 and S804 to be described later) for each partner apparatus. Also, if the result changes depending on the partner apparatus, the AP 102 may perform both the processes of steps S803 and S804. Note that whether the connected partner apparatus (STA 103) has the multilink communication capability can be acquired, for example, from device capability information (Capability Information) transmitted from the partner apparatus at the time of connection. The presence/absence of this capability may be determined depending on whether the partner apparatus can perform communication corresponding to a specific standard (for example, the IEEE 802.11 be standard).

The determination of step S802 can be omitted if a predetermined determination result is obtained independently of the situation such as if it is always determined that multilink communication cannot be executed due to a factor such as an antenna, or if it is always determined that multilink communication can be executed because resources such as an antenna and a RAM are sufficiently prepared. In this case, in a situation where it is always determined that multilink communication cannot be executed, the processing of step S803 is executed, and the processing of step S804 is not executed. Alternatively, in a situation where it is always determined that multilink communication can be executed, the processing of step S804 is executed, and the processing of step S803 is not executed. Note that in this embodiment, the AP 102 establishes radio links with the STA 103 in the 2.4 GHz band, the 5 GHz band, and the 6 GHz band, and determines, in step S802, that multilink communication can be performed.

Step S803 is processing executed if the AP 102 cannot execute multilink communication. In this case, since the AP 102 is connected to the STA 103 only in 36ch of the 5 GHz band, the frequency channel to be used needs to be changed from the frequency channel to another frequency channel.

Hence, the AP 102 transmits, to the STA 103, a radio frequency change notification for changing the radio frequency to be used. For example, the AP 102 transmits a radio frame including an element called a Channel Switch Announcement defined in the IEEE 802.11 standard series. The structure of this element is shown in FIG. 9. Of fields shown in FIG. 9, a New channel number 904 stores a value indicating the number of a radio frequency channel to be used after the change. Hence, after the frequency channel to be used is changed to the frequency channel indicated by the value stored in the New channel number 904, the AP 102 and the STA 103 continue communication. Note that although an example in which the change of the radio frequency is notified by the Channel Switch Announcement element has been described here, this notification may be done by another element. For example, an Extended Channel Switch Announcement element may be used to notify the change of the radio frequency.

Step S804 is processing executed if the AP 102 can execute multilink communication. In this case, the AP 102 can establish a radio link with the STA 103 using a frequency channel other than 36ch of the 5 GHz band. Hence, the AP 102 transmits, to the STA 103, a BSSID that is the network identifier of a Basic Service Set (BSS) operating at a radio frequency of high communication quality in the usable frequencies, and performs communication in the BSS. For example, the AP 102 can notify the STA 103 of a BSSID corresponding to the radio frequency of highest communication quality in the usable frequencies. The AP 102 may specify radio frequencies whose communication quality exceeds a predetermined value in the usable frequencies and notify the STA 103 of a BSSID corresponding to a radio frequency that is selected at random or satisfies a specific criterion such as the lowest frequency in the radio frequencies. The radio frequency of high communication quality here can be specified based on a value directly indicating radio quality, such as an Signal-to-Noise Ratio (SNR) or an Received Signal Strength Indicator (RSSI). However, the present invention is not limited to this, and a radio frequency having a state in which the communication quality is estimated as high may be specified. For example, the smaller the number of established connections is, the smaller the number of communications to be executed is, and the lower the interference occurrence frequency is, the higher the estimated communication quality of a radio frequency is. For this reason, the radio frequency may be selected based on these states. In an example, a radio frequency for which the number of established connections is zero can be selected. In addition, a radio frequency that is not a target of DFS may be selected. A radio frequency may be selected by a combination of these.

The AP 102 can execute this notification by, for example, further adding the information of a BSSID to a Channel Switch Announcement element as shown in FIG. 10 and transmitting a radio frame including the element to the STA 103. The AP 102 may execute this notification by adding the BSSID to another existing element and transmitting the element or by including the BSSID in an element that is not currently defined and transmitting the element. Note that in this embodiment, an example in which a BSSID corresponding to a radio frequency is notified has been described. However, the present invention is not limited to this, and the STA 103 may be notified of arbitrary information for allowing the STA 103 to specify the radio frequency at which the AP 102 can execute communication. For example, the STA 103 may be notified of an Extended Service Set ID (ESSID) or a Medium Access Control (MAC) address. In this way, the AP 102 can make a notification to the STA 103 such that communication in 36ch of the 5 GHz band is performed in a radio link of another frequency channel. Note that in step S804, information representing a frequency channel whose radio link is not established between the AP 102 and the STA 103 may be notified. In this case, the STA 103 can newly establish a radio link in addition to the currently established radio link based on received information such as a BSSID and shift the communication to the newly established radio link.

As described above, in an environment in which a plurality of radio links in a plurality of radio frequencies can be used, if interference with a specific radio wave occurs in a predetermined frequency band, information for specifying a radio frequency of high communication quality in the plurality of radio frequencies is transmitted from the AP 102 to the STA 103. When communication is continued using the specified radio frequency, the communication can be continued while preventing interference from occurring in the radio link under communication without performing radio frequency change processing in the AP 102. That is, if interference occurs concerning communication in some frequency bands of a plurality of usable frequency bands, communication is performed in another frequency band of the plurality of frequency bands, thereby making it possible to easily continue the communication while preventing occurrence of interference. In addition, when the frequency band to be used is switched in the plurality of frequency bands determined to be usable, the time until communication is continued can be shortened. For example, in the conventional DFS, after the radio frequency is switched in accordance with detection of interference, it is necessary to scan and confirm for 60 sec whether interference does not occur in the radio frequency of the switching destination. On the other hand, in this embodiment, since interference detection is repetitively executed in advance even in other usable frequency bands, scan after switching need not be performed, and communication can be continued in a usable frequency band.

Note that in the above-described processing, an example in which in a frequency band where interference occurs, the AP 102 notifies the STA 103 of information for specifying another usable frequency band has been shown. On the other hand, in a case where a plurality of radio links are established in a plurality of frequency bands, when a radio link where interference occurs is disconnected, it is possible to continue communication using a radio link of another frequency band that is maintained without disconnection while preventing occurrence of interference. The procedure of this processing will be described with reference to FIG. 11. Note that the processing shown in FIG. 11 can be implemented by, for example, the control unit 302 of the AP 102 (or the STA 103 in some cases) executing a program stored in the storage unit 301. In addition, dedicated hardware for implementing the processing shown in FIG. 11 may be prepared, or, for example, the communication unit 306 of the AP 102 (or the STA 103 in some cases) may execute the processing shown in FIG. 11 by a chip or the like provided in the communication unit 306.

Steps S801 to S803 are the same as in the processing shown in FIG. 8, and a description thereof will be omitted. The AP 102 determines whether a radio link established with the STA 103 exists other than the radio link as the target of the processing (step S1101). For example, the AP 102 determines whether it is connected to the STA 103 using a frequency channel other than, for example, 36ch of the 5 GHz band. In this embodiment, the AP 102 establishes connection with the STA 103 in 5ch of the 2.4 GHz band or 220ch of the 6 GHz band. Hence, in the processing for 36ch of the 5 GHz band, the AP 102 determines that a radio link established with the STA 103 exists other than the radio link of the processing target (YES in step S1101). In this case, the AP 102 disconnects the radio link of 36ch of the 5 GHz band without notifying the STA 103 of the information of a radio link after change (step S1102). At this time, other radio links are maintained without disconnection. Hence, even if the radio link is disconnected, another radio link is established between the AP 102 and the STA 103. It is therefore possible to continue communication. Note that if data that is being communicated exists in the radio link of the processing target, the data may be discarded, or may be transmitted/received via another radio link. On the other hand, in the processing for 36ch of the 5 GHz band, if connection is not established with the STA 103 in a radio link other than 36ch (NO in step S1101), the AP 102 advances the process to step S803 to execute switching of the radio frequency to be used. In this case, if complying with, for example, DFS, a predetermined period occurs to determine whether interference with a specific radio wave occurs in the frequency channel after switching. Note that in this case, a new communication link may be established by transmitting a BSSID, as in step S804 in the example of FIG. 8. As described above, if a plurality of radio links are established in a plurality of frequency bands (or a plurality of radio channels), the AP 102 and the STA 103 can easily prevent interference by disconnecting communication in the frequency channel where interference with a radio wave of a specific application purpose occurs. Also, at this time, communication can be continued using another frequency channel under connection, and communication can efficiently be continued without needing to perform processing for switching the channel.

Note that it has been described above that the above processing is executed by the AP 102, but the STA 103 may execute the processing. That is, the processing executed by the AP 102 when the AP 102 determines that interference with a radio wave of a specific application purpose occurs may be executed by the STA 103. Accordingly, in a situation where the AP 102 cannot detect interference, but the STA 103 detects interference, it is possible to continue communication while appropriately changing the use frequency band to suppress interference. Also, in the above-described processing, for example, if communication is continued in the 2.4 GHz band or the 6 GHz band in accordance with a situation where interference occurs in 36ch of the 5 GHz band, use of the 5 GHz band is stopped. At this time, the usability of another frequency channel of the 5 GHz band may be determined. If it is determined that, for example, a frequency channel of the 5 GHz band other than 36ch can be used, a radio link is established using the frequency channel. Hence, for example, if interference with a specific radio wave occurs in the 2.4 GHz band or the 6 GHz band after that, the 5 GHz band can be used as a candidate of a usable frequency band. In addition, for example, the presence/absence of interference may continuously be evaluated during the period in which communication in 36ch of the 5 GHz band is not performed, and it may be determined, based on the evaluation result, whether to leave 36ch of the 5 GHz band as a usable frequency band.

Also, in step S1102, during a predetermined time from the disconnection of the radio link of 36ch of the 5 GHz band, the AP 102 (or the STA 103) may monitor whether interference with a specific radio wave occurs. If interference with a specific radio wave does not occur during the predetermined time, the AP 102 (or the STA 103) may establish the radio link of 36ch of the 5 GHz band again. In this case, the AP 102 (or the STA 103) may communicate (transmit and/or receive), in the 2.4 GHz band or the 6 GHz band in which communication is continued, a signal for establishing the radio link of 36ch of the 5 GHz band again.

As described above, in a case where it is determined that interference occurs in a first radio link under communication, and in a case where a self-apparatus supports multilink communication, the AP 102 (or the STA 103) executes first processing such as notification of a BSSID or disconnection of the first radio link. On the other hand, in a case where the self-apparatus does not support multilink communication, the AP 102 (or the STA 103) executes second processing such as transmission of a radio frame including a Channel switch announcement element. Both in a case w % here the first processing is executed and in a case where the second processing is executed, communication executed in the first radio link is continued using a second radio link of a frequency band (frequency channel) different from the first radio link. Hence, the AP 102/STA 103 having a capability of establishing a plurality of radio links can quickly continue the communication effectively using the plurality of radio links without changing the setting of the usable frequency band. On the other hand, the AP 102/STA 103 that does not have the capability of establishing a plurality of radio links can continue the communication by switching the frequency channel to be used, although a relatively long time is needed to switch the channel.

Note that the above embodiment has been described assuming that wireless communication complying with the IEEE 802.11 standard series is performed. However, the present invention is not limited to this. That is, the above-described technique can be applied to a wireless communication apparatus capable of establishing a plurality of radio links with a partner apparatus by concurrently using different frequency bands (frequency channels). For example, if the communication apparatus has a function of establishing a plurality of radio links to perform communication upon determining that interference occurs, a radio link to be used to continue the communication is specified in the plurality of radio links, and information such as a network identifier of the radio link is notified to the partner apparatus. On the other hand, if the communication apparatus does not have the function of establishing a plurality of radio links to perform communication, information for designating a frequency channel after change is notified to the partner apparatus. Hence, if a plurality of radio links can be used, it is possible to quickly continue the communication effectively using the plurality of radio links while avoiding interference.

Also, in the above-described embodiment, an example in which communication is continued by changing the frequency channel based on occurrence of interference has been described. However, the present invention is not limited to this. For example, the above-described processing may be executed in accordance with degradation of quality of a radio link under communication. That is, the above-described processing can be executed in an arbitrary situation where the radio link under communication should be changed. At this time, if a plurality of radio links can be established, processing (for example, processing such as notification of a BSSID) different from conventional channel switching is performed to utilize the capability. Hence, in various situations where a radio link under communication needs to be switched, the communication apparatus (AP 102/STA 103) capable of using a multilink function can efficiently continue the communication.

According to the present invention, it is possible to efficiently execute use channel setting control in a case where a plurality of frequency channels of one or more frequency bands are concurrently used.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
a first communication unit configured to perform communication in a first radio link with a partner apparatus;
a second communication unit configured to perform communication in a second radio link with the partner apparatus;
at least one memory that stores a set of instructions; and
at least one processor that executes the instructions, the instructions, when executed, causing the communication apparatus to perform operations comprising:
controlling to establish the first radio link and the second radio link with the partner apparatus based on communication of association frames with the partner apparatus in the first radio link;
controlling to detect a predetermined radar radio wave;
controlling to disconnect the first radio link without notifying, by the first communication unit, a radio frame indicating of switching to a second frequency channel that is different from a frequency channel that is used for the communication performed in the first radio link with the partner apparatus to the partner apparatus, in a case where the predetermined radar radio wave is detected in the first radio link and the first radio link and the second radio link have been established with the partner apparatus; and
controlling to communicate using the second radio link so as to continue the communication that has been performed in the first radio link with the partner apparatus.

2. The communication apparatus according to claim 1, wherein, in a case where the first radio link only has been established with the partner apparatus and the predetermined radar radio wave is detected in the frequency channel that is used for the communication performed in the first radio link with the partner apparatus, the instruction further cause the communication apparatus to switch the frequency that is used for the communication performed in the first radio link to the second frequency channel and control so as to continue, using the second frequency channel, the communication that has been performed in the first radio link with the partner apparatus.

3. The communication apparatus according to claim 1, wherein, in a case where the first radio link only has been established with the partner apparatus and the predetermined radar radio wave is detected in the frequency channel that is used for the communication performed in the first radio link with the partner apparatus, the instruction further cause the communication apparatus to establish the second radio link using the second frequency channel with the partner apparatus and control so as to continue, using the second radio link, the communication that has been performed in the first radio link with the partner apparatus.

4. The communication apparatus according to claim 1, wherein, in a case where the first radio link and the second radio link have been established with the partner apparatus, the instruction further cause the communication apparatus to disconnect the first radio link without a processing for switching the frequency channel that is used for the communication performed in the first radio link with the partner apparatus.

5. The communication apparatus according to claim 1, wherein the second frequency channel is a frequency channel that is not a target of Dynamic Frequency Selection.

6. The communication apparatus according to claim 2, wherein, in a case where the first radio link only has been established with the partner apparatus and the predetermined radar radio wave is detected in the frequency channel that is used for the communication performed in the first radio link with the partner apparatus, the instruction further cause the communication apparatus to control so as to transmit a radio frame indicating switching the frequency channel that is used for the communication performed in the first radio link with the partner apparatus to the second frequency channel to the partner apparatus.

7. The communication apparatus according to claim 1, wherein the radio frame includes a Channel switch announcement element complying with an IEEE 802.11 standard series.

8. The communication apparatus according to claim 1, wherein the first communication unit and the second communication unit perform communication complying with an IEEE 802.11 standard series.

9. A control method of a communication apparatus, the method comprising:
performing communication in a first radio link with a partner apparatus;
performing communication in a second radio link with the partner apparatus;

establishing the first radio link and the second radio link with the partner apparatus based on communication of association frames with the partner apparatus in the first radio link;

detecting a predetermined radar radio wave;

disconnecting the first radio link without notifying a radio frame indicating of switching to a second frequency channel that is different from a frequency channel that is used for the communication performed in the first radio link with the partner apparatus to the partner apparatus, in a case where the predetermined radar radio wave is detected in the first radio link and the first radio link and the second radio link have been established with the partner apparatus; and communicating using the second radio link so as to continue the communication that has been performed in the first radio link with the partner apparatus.

10. A non-transitory computer-readable storage medium that stores a program for causing a computer included in a communication apparatus to:

perform communication in a first radio link with a partner apparatus;

perform communication in a second radio link with the partner apparatus;

establish the first radio link and the second radio link with the partner apparatus based on communication of association frames with the partner apparatus in the first radio link;

detect a predetermined radar radio wave;

disconnect the first radio link without notifying a radio frame indicating of switching to a second frequency channel that is different from a frequency channel that is used for the communication performed in the first radio link with the partner apparatus to the partner apparatus, in a case where the predetermined radar radio wave is detected in the first radio link and the first radio link and the second radio link have been established with the partner apparatus; and communicate using the second radio link so as to continue the communication that has been performed in the first radio link with the partner apparatus.

* * * * *